US009113155B2

(12) United States Patent
Wu et al.

(10) Patent No.: US 9,113,155 B2
(45) Date of Patent: *Aug. 18, 2015

(54) 3D CAMERA MODULE AND 3D IMAGING METHOD USING SAME

(75) Inventors: Ting-Yuan Wu, New Taipei (TW); Chang-Wei Kuo, New Taipei (TW)

(73) Assignee: Wcube Co., Ltd., George Town (KY)

( * ) Notice: Subject to any disclaimer, the term of this patent is extended or adjusted under 35 U.S.C. 154(b) by 526 days.

This patent is subject to a terminal disclaimer.

(21) Appl. No.: 13/535,761

(22) Filed: Jun. 28, 2012

(65) Prior Publication Data

US 2013/0162777 A1 Jun. 27, 2013

(30) Foreign Application Priority Data

Dec. 27, 2011 (TW) .............................. 100148766 A

(51) Int. Cl.
*H04N 15/00* (2006.01)
*H04N 13/02* (2006.01)
*G03B 35/00* (2006.01)
*G03B 5/00* (2006.01)
*G03B 35/10* (2006.01)

(52) U.S. Cl.
CPC .............. *H04N 13/0239* (2013.01); *G03B 5/00* (2013.01); *H04N 13/0257* (2013.01); *G03B 35/10* (2013.01); *G03B 2205/0015* (2013.01); *G03B 2205/0069* (2013.01); *H04N 2213/001* (2013.01)

(58) Field of Classification Search
None
See application file for complete search history.

(56) References Cited

U.S. PATENT DOCUMENTS

| 5,231,443 | A | * | 7/1993 | Subbarao | 396/93 |
| 5,835,288 | A | * | 11/1998 | Yamada et al. | 359/793 |
| 7,433,586 | B2 | * | 10/2008 | Onozawa | 396/121 |
| 8,248,511 | B2 | * | 8/2012 | Robinson et al. | 348/335 |
| 8,325,265 | B2 | * | 12/2012 | Chen | 348/335 |
| 8,605,203 | B2 | * | 12/2013 | Wu et al. | 348/345 |
| 8,610,784 | B2 | * | 12/2013 | Terashima | 348/208.12 |
| 8,786,959 | B2 | * | 7/2014 | Wu et al. | 359/698 |
| 2005/0140793 | A1 | * | 6/2005 | Kojima et al. | 348/208.99 |
| 2006/0038911 | A1 | * | 2/2006 | Miyazaki | 348/345 |
| 2007/0146689 | A1 | * | 6/2007 | Araki et al. | 356/124.5 |
| 2008/0158346 | A1 | * | 7/2008 | Okamoto et al. | 348/47 |
| 2011/0037964 | A1 | * | 2/2011 | Imamura | 356/3.13 |
| 2011/0150453 | A1 | * | 6/2011 | Chang | 396/326 |
| 2013/0162782 | A1 | * | 6/2013 | Kuo et al. | 348/47 |
| 2013/0169595 | A1 | * | 7/2013 | Chang et al. | 345/175 |

FOREIGN PATENT DOCUMENTS

WO    WO2010/071001    *  6/2010

* cited by examiner

*Primary Examiner* — William C Vaughn, Jr.
*Assistant Examiner* — Lindsay Uhl
(74) *Attorney, Agent, or Firm* — Novak Druce Connolly Bove + Quigg LLP

(57) ABSTRACT

An 3D camera module includes a first and a second imaging units, a storage unit, a color separation unit, a main processor unit, an image processing unit, a driving unit, an image combining unit and two OIS units. The first and second imaging units capture images of an object(s) from different angles. The color separation unit separates the images into red, green and blue colors. The main processor unit calculates MTF values of the images and determines a shooting mode of the 3D camera module. The image processing unit processes the images to compensate for blurring of the images caused by being out of focus. The driving unit drives the first and second imaging units to optimum focusing positions according to MTF values. The image combining unit combines the images into a 3D image. The OIS units respectively detect and compensate for shaking of the first and second imaging units.

10 Claims, 6 Drawing Sheets

3D CAMERA MODULE AND 3D IMAGING METHOD USING SAME

BACKGROUND

1. Technical Field

The present disclosure relates to a three-dimensional (3D) camera module and a 3D imaging method using the 3D camera module.

2. Description of Related Art

Nowadays, 3D camera modules are more and more popular in many fields. In order to get sharp images, an auto-focusing (AF) function for a 3D camera module is needed.

Digital AF technology allows blurred images (out of focus images) to be processed by software modules, which may employ an extend depth of field (EDOF) technology, to get a sharp image. However, the digital AF technology does not work properly if an object distance is short, e.g. less than 40 cm. Furthermore, the digital AF technology may not work effectively when the camera is shaking.

What is needed therefore is a 3D camera module and a 3D imaging method using the 3D camera module addressing the limitations described.

BRIEF DESCRIPTION OF THE DRAWINGS

The components of the drawings are not necessarily drawn to scale, the emphasis instead being placed upon clearly illustrating the principles of the embodiments of the present disclosure. Moreover, in the drawings, like reference numerals designate corresponding parts throughout several views.

DETAILED DESCRIPTION

Figure 1:
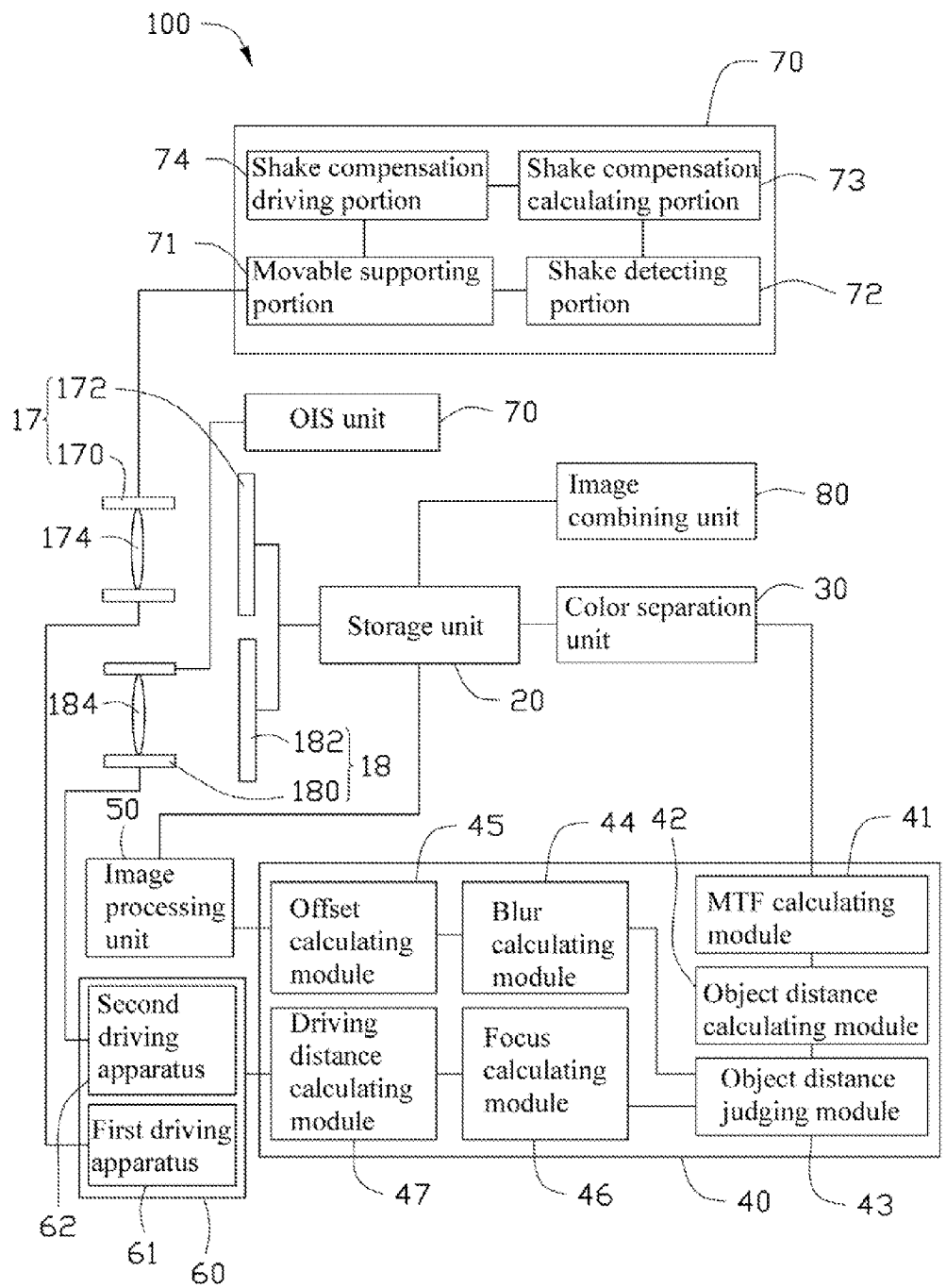
FIG. 1 is a schematic view of a 3D camera module, according to an exemplary embodiment of the present disclosure, the camera module comprising a first lens module.

Referring to FIG. 1, a 3D camera module 100, according to an exemplary embodiment of the present disclosure, is shown. The 3D camera module 100 includes a first imaging unit 17, a second imaging unit 18, a storage unit 20, a color separation unit 30, a main processor unit 40, an image processing unit 50, a driving unit 60, two optical image stabilizer (OIS) units 70, and an image combining unit 80. The storage unit 20 is electrically connected to the first imaging unit 17 and the second imaging unit 18. The color separation unit 30 is electrically connected to the storage unit 20, the main processor unit 40 is electrically connected to the color separation unit 30 and the image processing unit 50, and the driving unit 60 is electrically connected to the main processor unit 40. The driving unit 60 is also connected to the first imaging unit 17 and the second imaging unit 18. The OIS units 70 are respectively connected to the first imaging unit 17 and the second imaging unit 18. The image combining unit 80 is electrically connected to the storage unit 20.

The first imaging unit 17 includes a first lens module 170 and a first image sensor 172 aligned with the first lens module 170 along a first optical axis of the first imaging unit 17. The second imaging unit 18 includes a second lens module 180 and a second image sensor 182 aligned with the second lens module 180 along a second optical axis of the second imaging unit 18.

The first lens module 170 and the second lens module 180 each capture images of an object(s) and focus the images onto a sensing area of the first image sensor 172 or the second image sensor 182. The first lens module 170 includes at least one lens 174, and the second lens module 180 includes at least one lens 184. In this embodiment, the lenses 174, 184 are aspherical lenses.

The first image sensor 172 senses the images captured by the first lens module 170, and the second image sensor 182 senses the images captured by the second lens module 180. The first image sensor 172 and the second image sensor 182 each include a number of pixel units arranged in the sensing area, each pixel unit includes a red pixel, a green pixel, and a blue pixel. In the present embodiment, the number of the pixel units in each image sensor is not less than 2048×1536. In this illustrated embodiment, the first image sensor 172 and the second image sensor 182 each can be a charge-coupled device (CCD) or a complementary metal oxide semiconductor (CMOS). The images sensed by the first image sensor 172 and the second image sensor 182 each includes a number of image portions corresponding to the pixel units thereof.

The storage unit 20 stores images sensed by the first image sensor 172 and the second image sensor 182.

The color separation unit 30 separates images sensed by the first image sensor 172 and the second image sensor 182 into red, green and blue colors. In detail, each image portion of the images is separated into a red part, a green part, and a blue part. The red color parts of the image portions construct red images, the green parts of the image portions construct green images, and the blue parts of the image portions construct the blue images.

The main processor unit 40 includes a modulation transfer function (MTF) calculating module 41, an object distance calculating module 42, an object distance judging module 43, a blur calculating module 44, an offset calculating module 45, a focus calculating module 46, and a driving distance calculating module 47. The MTF calculating module 41 is electrically connected to the color separation unit 30, the object distance calculating module 42 is electrically connected to the MTF calculating module 41, the object distance judging module 43 is electrically connected to the object distance calculating module 42, the focus calculating module 46 and the blur calculating module 44 are electrically connected to the object distance judging module 43, the offset calculating module 45 is electrically connected to the blur calculating module 44 and the image processing unit 50, and the driving distance calculating module 47 is electrically connected to the focus calculating unit 46 and the driving unit 60.

The MTF calculating module 41 calculates MTF values of each image portion of an image sensed by the first image sensor 172 or the second image sensor 182. In this embodiment, the MTF calculating module 41 respectively calculates MTF values of the red part, the green part and the blue part of each image portion.

The object distance calculating module 42 calculates an object distance of an object in each image portion of the image according to the MTF values calculated by the MTF calculating module 41.

The object distance judging module 43 determines a shooting mode according to the object distances calculated by the object distance calculating module 42. In detail, the object distance judging module 43 analyzes the object distances calculated by the object distance calculating module 41, compares the results with a predetermined distance value(s), and determines the shooting mode. In this embodiment, the object distance judging module 43 analyzes the object distances of the pixel units and generates a reference object distance representing the distance-to-object of a reference object in the image. The predetermined distance value is used for distinguishing the shooting mode of the 3D camera module 100. In this embodiment, the predetermined standard value is 40 cm. If the reference object distance is more than 40 cm, the 3D camera module 100 is set at a long shooting mode (a second shooting mode); and if the reference object distance is equal to or less than 40 cm, the 3D camera module 100 is set at a close shooting mode (a first shooting mode).

The blur calculating module 44 compares the MTF values of each image portion of the image calculated by the MTF calculating module 41 with corresponding predetermined MTF values, calculates the differences between the obtained MTF values and the predetermined standard MTF values, and generates blur quantities of each image portion of the image. Each of the predetermined MTF values is an MTF value applying to the object in the image which is the sharpest, and the predetermined MTF values are different corresponding to different object distances. In this embodiment, the blur calculating module 44 calculates the blur quantities of the red part, the green part, and the blue part of each image portion. The blur calculating module 44 may select on state or off state for the blur calculating function thereof according to the shooting manner determined by the object distance judging module 43. In this embodiment, if the 3D camera module 100 is set at a long shooting mode, the blur calculating module 44 switches on the blur calculating function, and if the 3D camera module 100 is set at a close shooting mode, the blur calculating module 44 switches off the blur calculating function.

The offset calculating module 45 calculates offsets to compensate for blurring of each image portion according to the calculated result of the blur calculating module 44. In this embodiment, the offset calculating module 45 calculates offsets of the red part, the green part, and the blue part of each image portion.

The focus calculating module 46 calculates an optimum focusing position of the first lens module 170 or the second lens module 180 according to the calculated result of the object distance calculating module 42. The focus calculating module 46 may select on state or off state for the focus calculating function thereof according to the shooting mode determined by the object distance judging module 43. In this embodiment, if the 3D camera module 100 is set at a long shooting mode, the focus calculating module 46 switches off the focus calculating function, and if the 3D camera module 100 is set at a close shooting mode, the focus calculating module 46 switches on the focus calculating function.

The driving distance calculating module 47 calculates a driving distance of the first lens module 170 or the second lens module 180 according to the optimum focusing positions calculated by the focus calculating module 46.

The image processing unit 50 processes the image according to the calculated result of the offset calculating module 45 to get a sharp processed image. In detail, the image processing unit 50 compensates any blurring of each image portion of the image according to the offsets calculated by the offset calculating module 45. In this embodiment, the image processing unit 50 compensates for the blurring of the red part, the green part, and the blue part of each image portion.

The driving unit 60 includes a first driving apparatus 61 and a second driving apparatus 62. The first driving apparatus 61 and the second driving apparatus 62 respectively drive the first lens module 170 and the second lens module 180 to the optimum focusing positions according to the driving distances calculated by the driving distance calculating module 47. In this embodiment, the first driving apparatus 61 and the second driving apparatus 62 are piezoelectric actuators. Alternatively, the first driving apparatus 61 and the second driving apparatus 62 can be voice coil motors (VCM). Images captured by the first lens module 170 and the second lens module 180 at the optimum focusing positions are stored in the storage unit 20.

The OIS units 70 each includes a movable supporting portion 71, a shake detecting portion 72, a shake compensation calculating portion 73, and a shake compensation driving portion 74. The movable supporting portion 71 supports the lens 174 or 184 and is movable perpendicular to the first optical axis or the second optical axis. The shake detecting portion 72 detects any shaking of the lens 174 or 184 during shooting and transmits the detecting result to the shake compensation calculating portion 73. The shake compensation calculating portion 73 calculates a compensation value for compensating the shake of the lens 174 or 184 according to the detecting result from the shake detecting portion 72. The shake compensation driving portion 74 drives the movable supporting portion 71, so as to move the lens 174 or 184 to compensate the shaking of the lens 174 or 184 according to the compensation value calculated by the shake compensation calculating portion 73.

During shooting, the driving unit 60 drives the lens 174 or 184 to move along the first optical axis or the second optical axis, and the OIS units 70 drive the lens 174 or 184, thus any shaking of the lens 174 or 184 in focusing is compensated.

Figure 2:
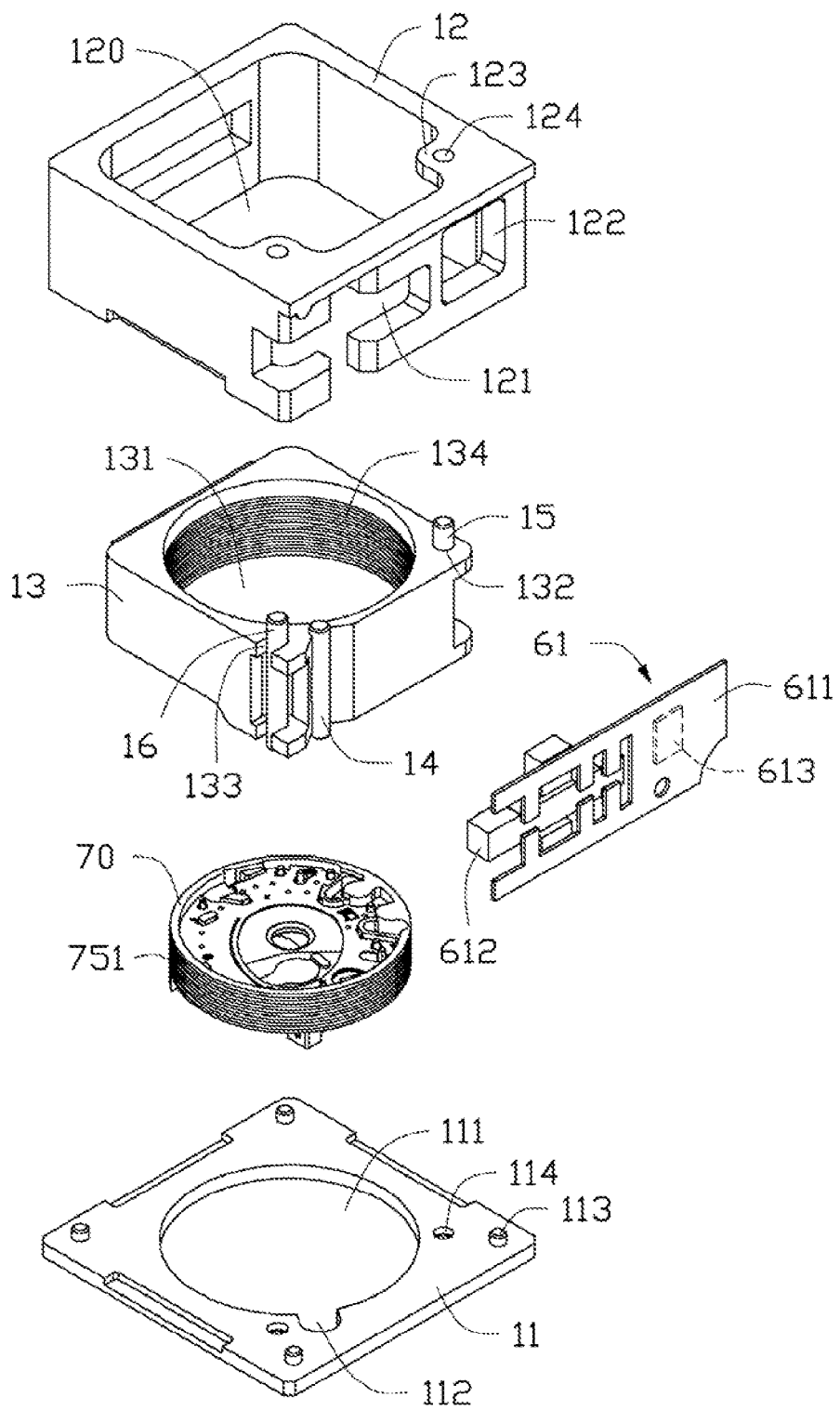
FIG. 2 is an exploded view of the first lens module of FIG. 1, the first lens module comprising an optical image stabilizing (OIS) unit.

Referring to FIG. 2, the first lens module 170, the first driving apparatus 61, and the OIS unit 70 corresponding to the first lens module 170 can be assembled with the first imaging unit 17. The first lens module 170 includes a base 11, a fixing frame 12, and a movable frame 13, a drive rod 14, a first guiding rod 15, and a second guiding rod 16.

The base 11 is substantially rectangular. The base 11 defines a circular light passing hole 111 and an arc-shaped receiving portion 112 communicating with the light passing hole 111. The light passing hole 111 is defined in a central portion of the base 11, and the receiving portion 112 is defined in an inner surface of the base 11. The base 11 includes a number of protrusions 113 upwardly protruding from a surface of the base 11. In this embodiment, there are four protrusions 113, and the protrusions 113 are respectively formed at the corners of the base 11. The base 11 further defines two fixing holes 114 respectively located at two neighboring corners of the base 11.

The fixing frame 12 is substantially rectangular. The fixing frame 12 defines a first receiving space 120 for receiving the movable frame 13, a first receiving opening 121 and a second receiving opening 122. The first receiving opening 121 and the second receiving opening 122 are defined in a sidewall of the fixing frame 12 and communicate with the first receiving space 120. The fixing frame 12 includes two protruding portions 123 formed on an upper surface of the fixing frame 12, the protruding portions 123 are located at two neighboring corners of the fixing frame 12 and protrude to a center of the fixing frame 12. Each protruding portion 123 defines an engaging hole 124 corresponding to a fixing hole 114 in the base 11.

The movable frame 13 is substantially rectangular. The movable frame 13 defines a circular second receiving space 131, a through hole 132, and a cutout 133. The through hole 132 and the cutout 133 are respectively located at two neighboring corners of the movable frame 13. The through hole 132 spatially corresponds to one of the engaging holes 124, and the cutout 133 spatially corresponds to the other of the engaging holes 124. The movable frame 13 includes an internal threaded portion 134 formed in an inner surface of the movable frame 13.

In assembly of the first lens module 170, the movable frame 13 is movably received in the first receiving space 120 of the fixing frame 12. The first guiding rod 15 passes through the through hole 132 and an end of first guiding rod 15 is fixed in one of the engaging holes 124. The second guiding rod 16 passes through the cutout 133 and an end of the second guiding rod 16 is fixed in the other of the engaging holes 124. The drive rod 14 is fixed on a corner of the movable frame 13 near the second guiding rod 16. The base 11 is fixedly connected to a lower end of the fixing frame 12. The protrusions 113*b* insert into a surface of the fixing frame 12 at the lower end. The other end of the first guiding rod 15 is fixed in one of the fixing holes 114, and the other end of the first guiding rod 15 is fixed in the other of the fixing holes 114. An end of the drive rod 14 near the base 11 is received in the receiving portion 112.

The first driving apparatus 61 is fixed in a sidewall of the fixing frame 12 and makes contact with the movable frame 13 for driving the movable frame 13 to move along the first optical axis. In this embodiment, the first driving apparatus 61 includes a circuit board 611, a piezoelectric member 612 and a driving chip 613. The piezoelectric member 612 and the driving chip 613 are fixed on the circuit board 611 and electrically connected to each other via the circuit board 611. The circuit board 611 is fixedly attached on an outer surface of the sidewall of the fixing frame 12. The piezoelectric member 612 is received in the first receiving opening 121 and is in contact with the drive rod 14 of the movable frame 13. The driving chip 613 is received in the second receiving opening 122.

Figure 3:
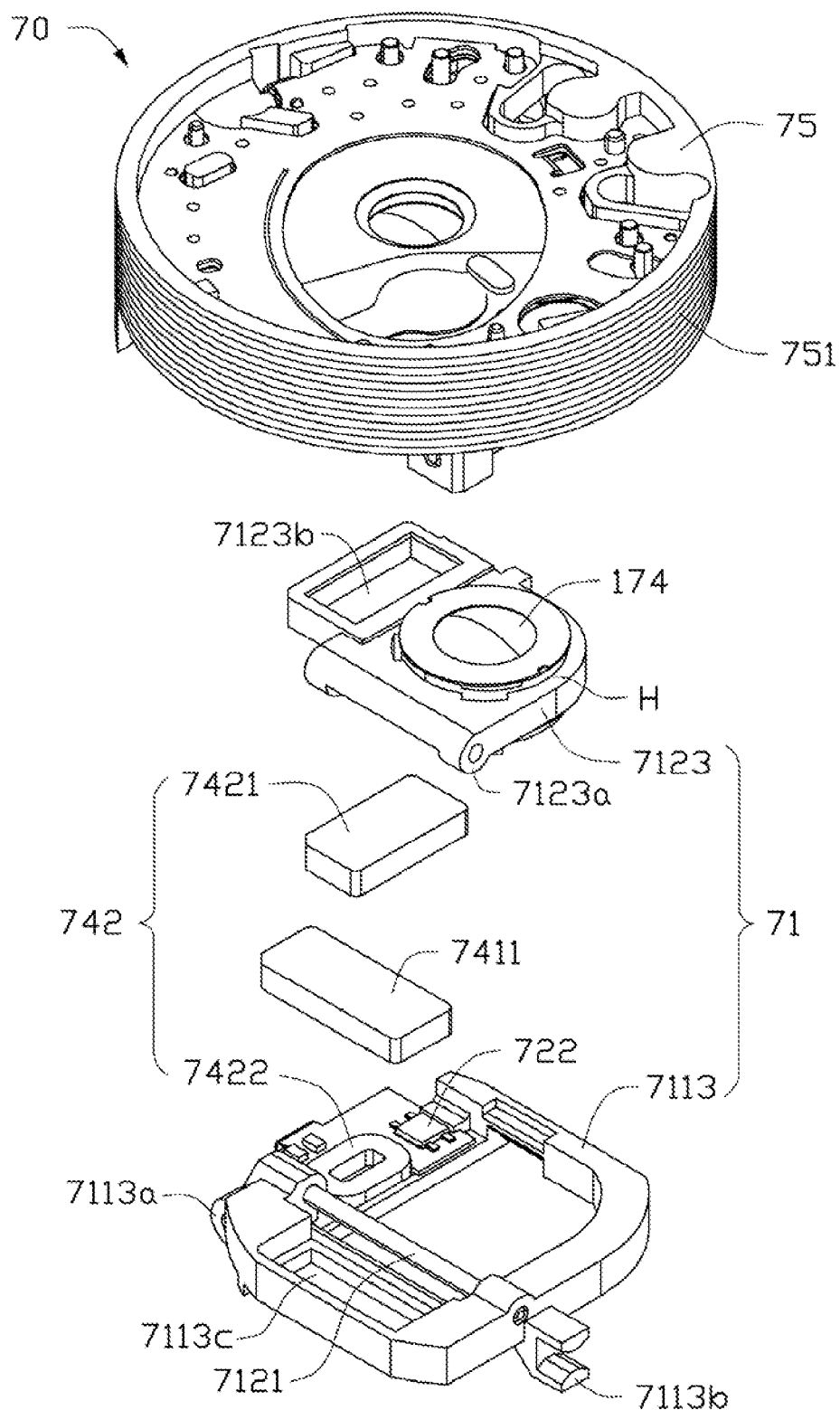
FIG. 3 is an exploded view of the OIS unit of FIG. 2.
Figure 4:
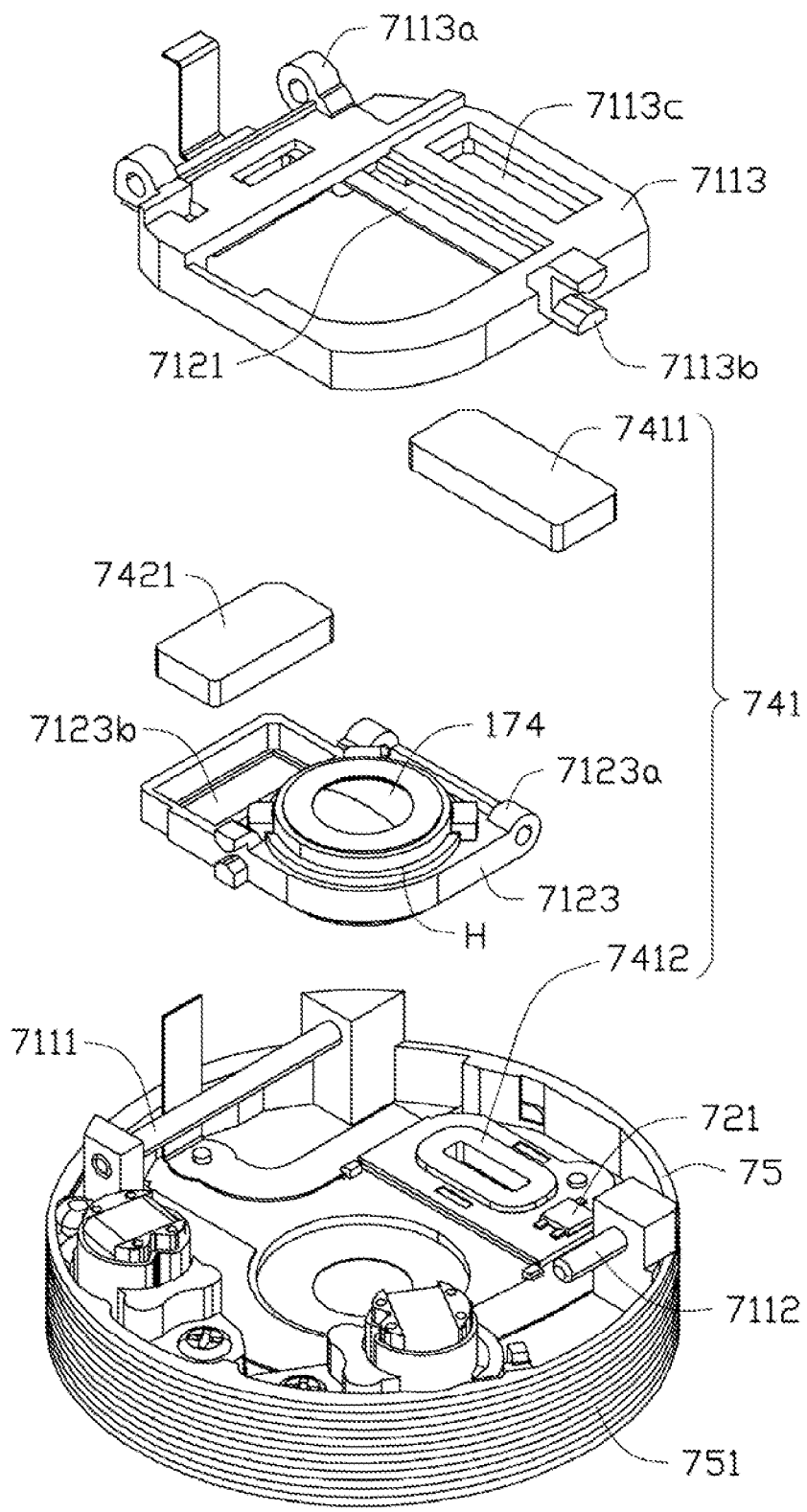
FIG. 4 is similar to FIG. 3, but showing the OIS unit from another angle.

The OIS unit 70 is received in the second receiving space 131 of the movable frame 13. Referring also to FIGS. 3-4, in this embodiment, the OIS unit 70 includes a fixed barrel 75. The fixed barrel 75 includes an external threaded portion 751 corresponding to the internal threaded portion 134 of the movable frame 13.

The movable supporting portion 71 includes a first slidable member 7113 and a second slidable member 7123.

The fixed barrel 75 includes a first direction guiding rod 7111 and a first auxiliary guiding rod 7112 substantially parallel to the first direction guiding rod 7111. The first direction guiding rod 7111 and the first auxiliary guiding rod 7112 guide the first slidable member 7113 along a first direction substantially perpendicular to the first optical axis. The first slidable member 7113 is substantially rectangular. The first slidable member 7113 includes a first yoke portion 7113*a* and a first auxiliary yoke portion 7113*b*. The first yoke portion 7113*a* and the first auxiliary yoke portion 7113*b* are respectively on two opposite outer sides of the first slidable member 7113. The first slidable member 7113 defines a first mounting groove 7113*c* in a sidewall thereof.

The first slidable member 7113 includes a second direction guiding rod 7121. The second direction guiding rod 7121 guides the second slidable member 7123 to move along a second direction substantially perpendicular to the first direction and the first optical axis. The second slidable member 7123 includes a second yoke portion 7123*a* on an outer side. The second slidable member 7123 defines a second mounting groove 7123*b* in a sidewall thereof and a lens mounting hole H in a central portion thereof. The lens 174 is fixedly received in the lens mounting hole H.

The shake detecting portion 72 includes a first Hall member 721 and a second Hall member 722. The first Hall member 721 is fixed on the fixed barrel 75, and the second Hall member 722 is fixed on the first slidable member 7113.

The shake compensation driving portion 74 includes a first direction driving unit 741 and a second direction driving unit 742. The first direction driving unit 741 includes a first magnet 7411 and a first coil 7412. The first coil 7412 is fixed on the fixed barrel 75 close to the first Hall member 721. The second direction driving unit 742 includes a second magnet 7421 and a second coil 7422. The second coil 7422 is fixed on the first slidable member 7113 close to the second Hall member 722.

In assembly of the OIS unit 70, the first magnet 7411 is fixedly received in the first mounting groove 7113*c*, the first yoke portion 7113*a* is slidingly fitted on the first direction guiding rod 7111, and the first auxiliary yoke portion 7113*b* is slidingly fitted on the first auxiliary guiding rod 7112. The first direction guiding rod 7111 and the first auxiliary guiding rod 7112 are respectively fixed at two opposite sides of the fixed barrel 75. The second magnet 7421 is fixedly received in the second mounting groove 7123*b*, and the second yoke portion 7123*a* is slidingly fitted on the second direction guiding rod 7121. The first Hall member 721 and the first coil 7412 are aligned with the first magnet 7411 along a direction parallel to the first optical axis, and the second Hall member 722 and the second coil 7422 are aligned with the second magnet 7421 along a direction parallel to the first optical axis.

The OIS unit 70 is fixedly received in the second receiving space 131. The external threaded portion 751 engages with the internal threaded portion 134 of the movable frame 13.

In use, the first magnet 7411 forms a first magnetic field around the first coil 7412 and the first Hall member 721, and the second magnet 7421 forms a second magnetic field around the second coil 7422 and the second Hall member 722. If no shaking occurs, the intensities of the first magnetic field and the second magnetic field are constant. If any shake does occur, the first slidable member 7113 may deviate from its original position along the first direction, and/or the second slidable member 7123 may deviate from its original position along the second direction.

If the first slidable member 7113 deviates along the first direction, the intensity of the first magnetic field around the first Hall member 721 will accordingly change, which is detected by the first Hall member 721. Therefore, the amount of any deviation of the first slidable member 7113 along the first direction can be calculated according to the changing of the intensity of the first magnetic field detected by the first Hall member 721, and a compensating offset can be calculated by the shake compensation calculating portion 73 for the first slidable member 7113. If the second slidable member 7123 deviates along the second direction, the intensity of second magnetic field around the second Hall member 722 will accordingly change, then the second Hall member 722 can detect the changing of the intensity of the second magnetic field around the second Hall member 722. Therefore, any deviation of the second slidable member 7123 along the second direction can be calculated according to the changing of the intensity of the second magnetic field detected by the second Hall member 722, and a compensating offset for the second slidable member 7123 can be calculated by the shake compensation calculating portion 73.

The first coil 7412 can produce a magnetic force to alter the natural position(s) of the first slidable member 7113 so as to compensate for the deviation, by outputting a current calculated to negate any deviation of the first slidable member 7113. The second coil 7422 can function in exactly the same manner in relation to the second slidable member 7123. By these means, an image stabilizing function of the 3D camera module 100 can be achieved.

Furthermore, the driving chip 613 controls the piezoelectric member 612 to move the movable frame 13 along the first optical axis according to the driving distance calculated by the driving distance calculating module 47, thus the lens 174 can be located at an optimum focusing position.

The second lens module 180, the second driving apparatus 62, and the OIS unit 70 corresponding to the second lens module 180 also can be integrated with the second imaging unit 18 in a similar way as the first lens module 170, the first driving apparatus 61 and the OIS unit 70 corresponding to the first lens module 170.

The image combining unit 80 combines images captured by the first lens module 170 and the second lens module 180 in the optimum focusing positions at the same time and generates a 3D image or combines images which are captured by the first lens module 170 and the second lens module 180 at the same time and then processed by the image processing unit 50 to generate a 3D image. In detail, image combining unit 80 reads images of a same object(s) captured by the first lens module 170 and the second lens module 180 at the same time from different angles, generates information about depth of field according to the different angles, and combines the images into a 3D image according to the information about depth of field.

Figure 5A:
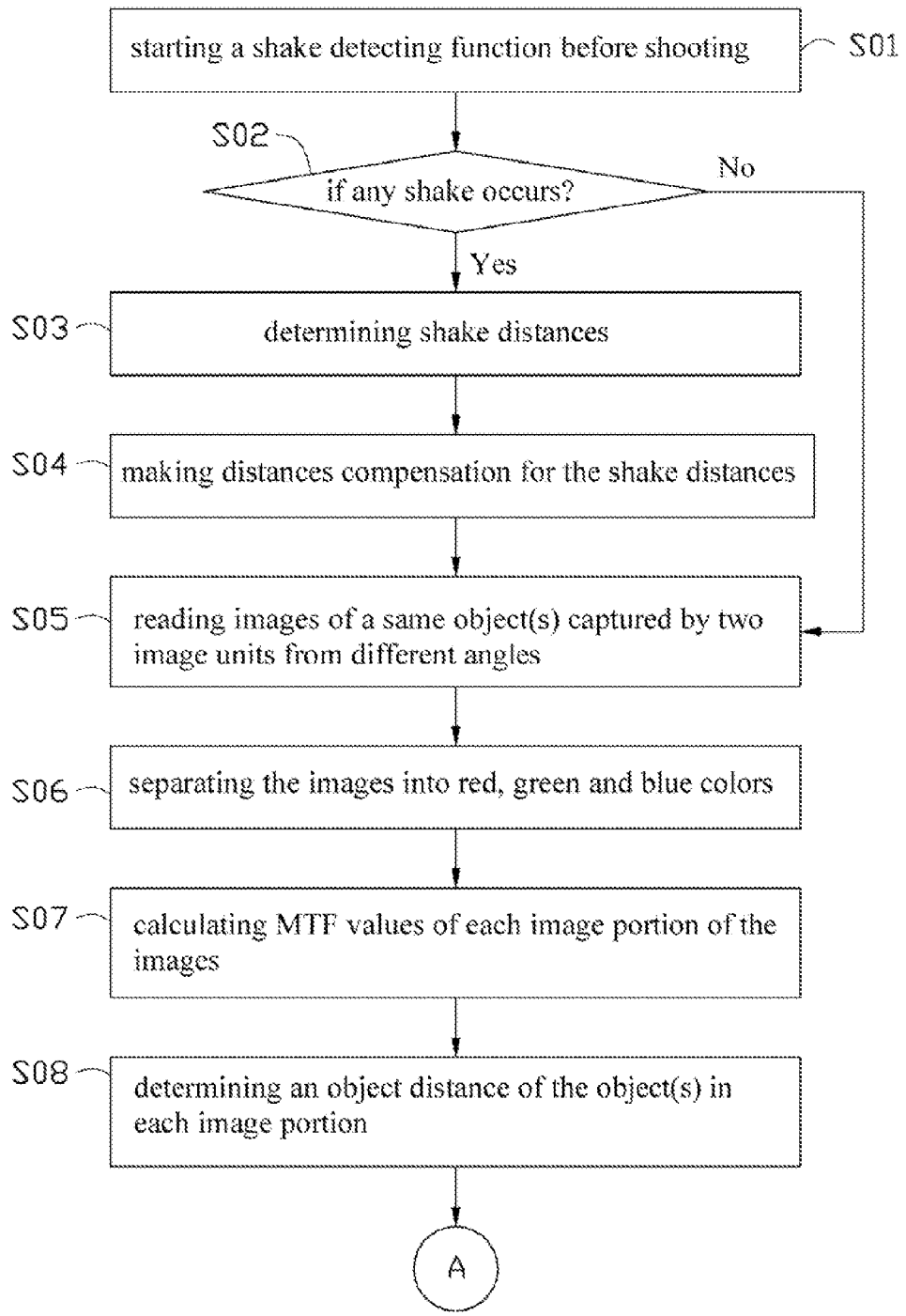
FIGS. 5A and 5B are flowcharts of a 3D imaging method, according to an exemplary embodiment of the present disclosure.
Figure 5B:
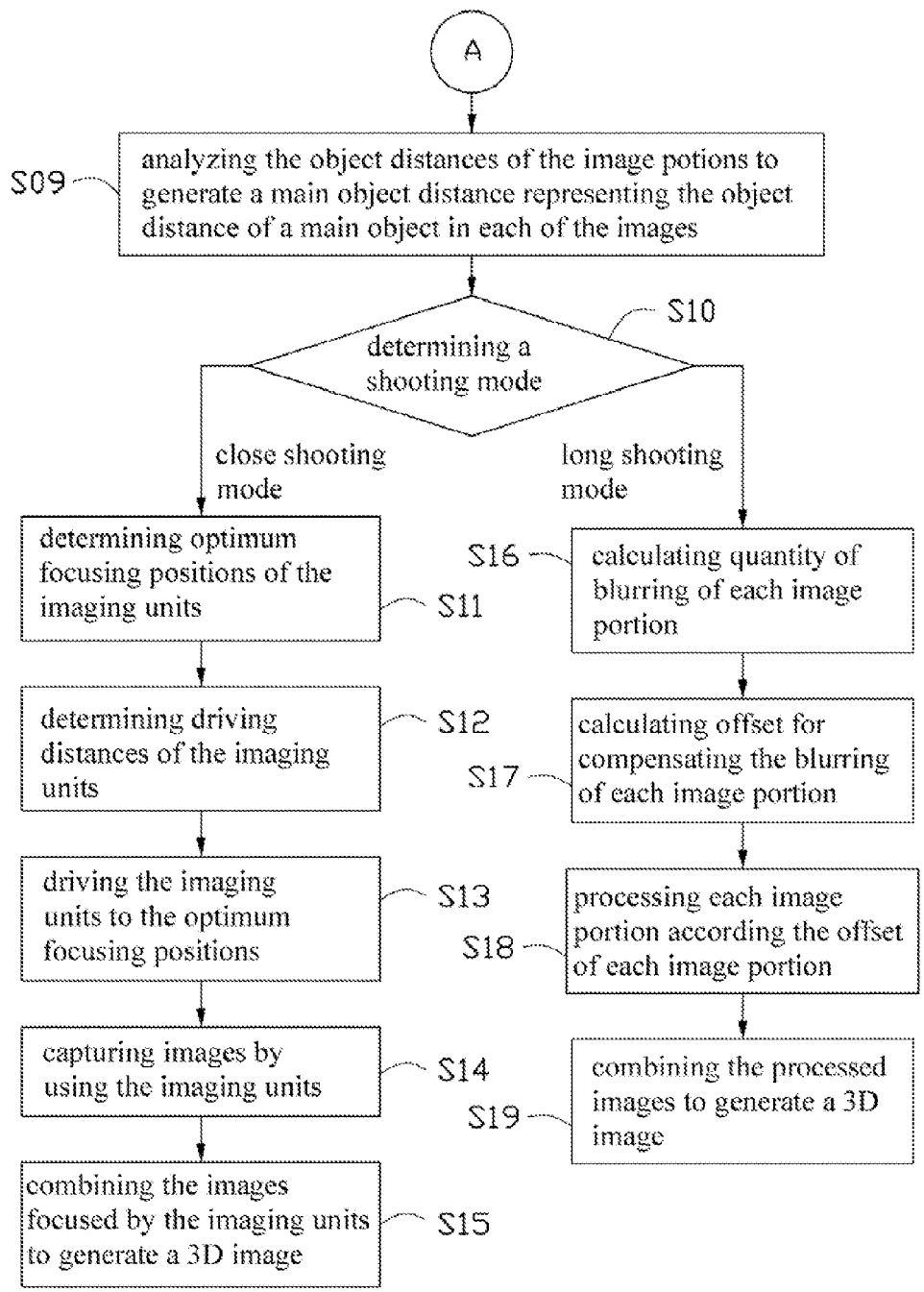

Referring to FIGS. 5A and 5B, an exemplary embodiment of a 3D imaging method using the 3D camera module 100 is shown. The 3D imaging method includes the following described steps.

In S01, a shake detecting function of the AF camera module 100 is started before shooting.

In S02, whether any shaking occurs before shooting is determined by the shake detecting function In S03, a shake distance is determined upon a condition that any shake occurs.

In S04, a distance compensation for the shake distance is made.

In S05, images of a same object(s) captured from different angles are read.

In S06, the images are separated into red, green, and blue colors. Each image portion of one image is separated into a red color part, a green color part and a blue color part.

In S07, MTF values of each image portion of the images are calculated. The MTF values of the red part, the green part and the blue part of each image portion are calculated.

In S08, the object distance of the object(s) in each image portion is determined according to the MTF values of each image portion.

In S09, a main object distance representing the object distance of a main object in each of the images is generated by analyzing the object distances of the image potions.

In S10, a shooting mode of the 3D camera module 100 is determined according to the object distance of the object(s) in each image portion.

If the 3D camera module 100 is set at a close shooting mode, the following steps are executed:

In S11, optimum focusing positions of the first lens module 170 and the second lens module 180 are determined according to the object distance of the object(s) in each image portion.

In S12, driving distances of the first lens module 170 and the second lens module 180 are determined according to the optimum focusing positions.

In S13, the first lens module 170 and the second lens module 180 are respectively driven to the optimum focusing positions according to the driving distances.

In S14, the first lens module 170 and the second lens module 180 capture properly focused images at the same time.

In S15, images captured by the first lens module 170 and the second lens module 180 are combined to generate a 3D image.

If the 3D camera module 100 is set at a long shooting mode, the following steps are executed:

In S16, the quantity of blurring in each image portion is calculated according to the MTF values.

In S17, offset for compensating the blurring in each image portion is calculated according to the quantities of blurring of each image portion.

In S18, each image portion is processed according to the offset of each image portion. Then, the processed images can be stored as properly focused image.

In S19, the processed images are combined to generate a 3D image.

The 3D camera module 100 and the 3D imaging method using the 3D camera module 100 determine a shooting mode according to an object distance and may select either a mechanical manner or a digital manner, thus a sharp 3D image can be generated whether an object distance is short or not. In addition, the 3D camera module 100 can detect and correct image blur because of shaking before or during shooting, thus a satisfactory AF result can be ensured.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. An 3D camera module comprising:
    a first imaging unit for capturing an image of object from a first angle;
    a second imaging unit for capturing another image of the object from a second angle different from the first angle;
    a storage unit for storing the images captured by the first imaging unit and the second imaging unit;
    a color separation unit for separating the images captured by the first imaging unit and the second imaging unit into red, green and blue colors;
    a main processor unit electrically connected to the color separation unit, the main processor unit being configured for calculating MTF values of the images and determining a shooting mode of the 3D camera module, wherein the shooting mode comprises a first shooting mode and a second shooting mode;
    an image processing unit electrically connected to the main processor unit and the storage unit, the image processing unit processing the images according to the MTF values calculated by the main processor unit to compensate blurs of the images caused by out of focus when the second shooting mode is selected, the storage unit being configured for storing the processed images by the image processing unit;
    a driving unit electrically connected to the main processor unit, the driving unit moving the first imaging unit and the second imaging unit to focusing positions according to the MTF values calculated by the main processor unit when the first shooting mode is selected, the storage unit being configured for storing the images captured by the first imaging unit and the second imaging unit in the focusing positions;

an image combining unit electrically connected to the storage unit and configured for combining the processed images by the image processing unit or the images by the first imaging unit and the second imaging unit in the focusing positions to generate a 3D image; and two OIS units, each of the OIS units connected to a respective one of the first imaging unit and the second imaging unit for detecting shakes of the respective one of the first imaging unit and the second imaging unit before shooting and driving the respective one of the first imaging unit and the second imaging unit to compensate the detected shakes;

wherein the first imaging unit comprises a first lens module and a first image sensor aligned with the first lens module along a first optical axis of the first imaging unit, and the second imaging unit comprises a second lens module and a second image sensor aligned with the second lens module along a second optical axis of the second imaging unit;

wherein the first image sensor and the second image sensor each comprise a plurality of pixel units arranged in a sensing area thereof, each pixel unit comprising a red pixel, a green pixel and a blue pixel, the image sensed by the first image sensor or the second image sensor comprises a plurality of image portions, each of the image portions corresponds to a pixel unit;

wherein the main processor unit comprises:
- a MTF calculating module configured for calculating MTF values of each image portion of the images;
- an object distance calculating module configured for calculating an object distance of an object in each image portion of the images according to the MTF values;
- an object distance judging module configured for determining the shooting mode according to the object distances of the image portions;
- a blur calculating module configured for comparing the MTF values of each image portion calculated by the MTF calculating module with corresponding predetermined MTF values, calculating the differences between the MTF values and the predetermined MTF values, and generating blur quantities of each image portion of the images according to the MTF value differences;
- an offset calculating module configured for calculating offset to compensate a blur of each image portion according to the blur quantities;
- a focus calculating module configured for calculating the focusing positions of the first lens module and the second lens module according to the object distance of the object in each image portion; and
- a driving distance calculating module configured for calculating driving distances of the first lens module and the second lens module according to the focusing positions calculated by the focus calculating module.

2. The 3D camera module of claim 1, wherein the first lens module and the second lens module each comprise at least one piece of aspherical lens.

3. The 3D camera module of claim 1, wherein the MTF calculating module respectively calculates MTF values of each image portion of red, green and blue colors.

4. The 3D camera module of claim 3, wherein the object distance judging module analyzes the object distances calculated by the object judging module to get an analysis result, compares the analysis result with a predetermined distance value, and determines the shooting mode.

5. The 3D camera module of claim 4, wherein the object distance judging module analyzes the object distances of the image portions and generates a reference object distance representing the object distance of a reference object in each of the images.

6. The 3D camera module of claim 5, wherein the predetermined distance value is 40 cm; if the reference object distance is more than 40 cm, the 3D camera module is set at the second shooting mode; if the reference object distance is equal to or less than 40 cm, the 3D camera module is set at the first shooting mode.

7. The 3D camera module of claim 1, wherein the driving unit comprises a first driving apparatus for driving the first imaging unit and a second driving apparatus for driving the second imaging unit.

8. The 3D camera module of claim 7, wherein the first driving apparatus and the second driving apparatus are piezoelectric actuators.

9. An 3D imaging method, comprising:
- starting a shake detecting function before shooting;
- determining shake distances upon a condition that a shake occurs;
- making distances compensation for the shake distances;
- reading images of an object captured by two imaging units from different angles;
- separating the images into red, green and blue colors, wherein the images each comprise a plurality of image portions;
- calculating MTF values of each image portion of the images;
- determining an object distance of the object in each image portion according to the MTF values of each image portion;
- analyzing the object distances of the image portions to generate a reference object distance representing the object distance of a reference object in each of the images;
- selecting a first shooting mode upon a condition that the reference object distance is equal to or less than a predetermined distance value;
- determining focusing positions of the imaging units according to the object distance of the object in each image portion;
- determining driving distances of the imaging units according to the focusing positions;
- driving the imaging units to the focusing positions according to the driving distances;
- capturing images by using the imaging units in the focusing positions; and
- combining the images captured by the imaging units in the focusing positions to generate a 3D image.

10. The 3D imaging method of claim 9, further comprising:
- selecting a second shooting mode upon a condition that the reference object distance is more than a predetermined distance value;
- calculating quantity of blurring of each image portion according to the MTF values;
- calculating offset for compensating blurring of each image portion according to the quantity of blurring of each image portion;
- processing each image portion according to the offset of each image portion; and
- combining the processed images to generate a 3D image.

* * * * *